US009497473B2

United States Patent
Pu et al.

(10) Patent No.: US 9,497,473 B2
(45) Date of Patent: Nov. 15, 2016

(54) HIGH PRECISION EXPLICIT WEIGHTED PREDICTION FOR VIDEO CODING

(71) Applicant: QUALCOMM Incorporated, San Diego, CA (US)

(72) Inventors: Wei Pu, San Diego, CA (US); Jianle Chen, San Diego, CA (US); Marta Karczewicz, San Diego, CA (US); Woo-Shik Kim, San Diego, CA (US); Joel Sole Rojals, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/504,097

(22) Filed: Oct. 1, 2014

(65) Prior Publication Data
US 2015/0098503 A1    Apr. 9, 2015

Related U.S. Application Data

(60) Provisional application No. 61/886,230, filed on Oct. 3, 2013, provisional application No. 61/892,198, filed on Oct. 17, 2013.

(51) Int. Cl.
*H04N 19/70* (2014.01)
*H04N 19/44* (2014.01)
(Continued)

(52) U.S. Cl.
CPC ............ *H04N 19/44* (2014.11); *H04N 19/105* (2014.11); *H04N 19/136* (2014.11); *H04N 19/50* (2014.11); *H04N 19/597* (2014.11); *H04N 19/70* (2014.11)

(58) Field of Classification Search
CPC ................. H04N 19/50; H04N 19/44; H04N 19/00533; H04N 19/00569; H04N 19/136; H04N 19/597; H04N 19/105; H04N 19/70; H04N 19/00884

USPC ......................................... 375/240.12, 240.25
See application file for complete search history.

(56) References Cited

U.S. PATENT DOCUMENTS

| 2011/0293003 | A1* | 12/2011 | Luo | G06T 5/009 375/240.12 |
| 2015/0350661 | A1* | 12/2015 | Yin | H04N 19/80 375/240.02 |

FOREIGN PATENT DOCUMENTS

WO    WO 2014099370 A1 *  6/2014  ............. H04N 19/80

OTHER PUBLICATIONS

Flynn et al. "High Efficiency Video Coding (HEVC) Range Extensions text specification: Draft 4". JCTVC-N1005. Apr. 2013. 322 pages.*

(Continued)

*Primary Examiner* — Christopher S Kelley
*Assistant Examiner* — Zhihan Zhou
(74) *Attorney, Agent, or Firm* — Shumaker & Sieffert, P.A.

(57) ABSTRACT

In one example, a device for coding video data includes a memory configured to store video data, and a video coder configured to code a value for a syntax element representative of whether a high bit depth is enabled for the video data, and when the value for the syntax element indicates that the high bit depth is enabled: code a value for a syntax element representative of the high bit depth for one or more parameters of the video data, code values for the parameters such that the values for the parameters are representative of bit depths that are based on the value for the syntax element representative of the high bit depth, and code the video data based at least in part on the values for the parameters.

35 Claims, 5 Drawing Sheets

(51) Int. Cl.
*H04N 19/597* (2014.01)
*H04N 19/105* (2014.01)
*H04N 19/136* (2014.01)
*H04N 19/50* (2014.01)

(56) References Cited

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.223, Series H: Audiovisual and Multimedia Systems, Infrastructure of audiovisual services—Mutiplexing protocol for low bit rate multimedia communication, The International Telecommunication Union. Jul. 2001, 74 pp.
ITU-T H.263, Series H: Audiovisual and Multimedia Systems, Infrastructure of audiovisual services—Video Coding for law bit rate communication, The International Telecommunication Union. Jan. 2005, 226 pp.
Flynn, et al., "Range Extensions Draft 4," JCT-VC Meeting; Apr. 18-26, 2013, Vienna, (Joint Collaborative Team on Video Coding of ISO/IEC JTC1/SC29/WG11 and ITU-T SG.16 ); URL: http://wftp3.itu.int/av-arch/jctvc-site/, No. JCTVC-N1005-v3, XP030114950, 321 pp.
Kim, et al., "High Efficiency Video Coding (HEVC) Test Model 12 (HM 12) Encoder Description", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site, No. JCTVC-N1002, XP030114946, 36 pp.
Pu, et al., "High Precision Weighted Prediction for HEVC Range Extension", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-00235-v5, XP030115291, pp. 4 pp.
International Search Report and Written Opinion from International Application No. PCT/US2014/058822, dated Jan. 22, 2015, 12 pp.
Response to Written Opinion dated Jan. 22, 2015, from International Application No. PCT/US2014/058822, filed on Jul. 31, 2015, 31 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 643 pp.

\* cited by examiner

HIGH PRECISION EXPLICIT WEIGHTED PREDICTION FOR VIDEO CODING

This application claims the benefit of U.S. Provisional Application Ser. No. 61/886,230, filed Oct. 3, 2013, and Ser. No. 61/892,198, filed Oct. 17, 2013, the entire contents of each of which are incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for high precision explicit weighted prediction. These techniques may be used for a range extension for high efficiency video coding (HEVC), or extensions to other video coding standards.

In one example, a method of decoding video data includes decoding a value for a syntax element representative of whether a high bit depth is enabled for video data, when the value for the syntax element indicates that the high bit depth is enabled: decoding a value for a syntax element representative of the high bit depth for one or more parameters of the video data, decoding values for the parameters such that the values for the parameters have bit depths based on the value for the syntax element representative of the high bit depth, and decoding the video data based at least in part on the values for the parameters.

In another example, a method of encoding video data includes determining to enable a high bit depth for video data, after determining to enable the high bit depth: encoding a value for a syntax element indicating that the high bit depth is enabled, encoding a value for a syntax element representative of the high bit depth for one or more parameters of the video data, encoding values for the parameters such that the values for the parameters have bit depths based on the high bit depth, and encoding the video data based at least in part on the values for the parameters.

In another example, a device for coding video data includes a memory configured to store video data, and a video coder configured to code a value for a syntax element representative of whether a high bit depth is enabled for the video data, and when the value for the syntax element indicates that the high bit depth is enabled: code a value for a syntax element representative of the high bit depth for one or more parameters of the video data, code values for the parameters such that the values for the parameters have bit depths based on the value for the syntax element representative of the high bit depth, and code the video data based at least in part on the values for the parameters.

In another example, a device for coding video data includes means for coding a value for a syntax element representative of whether a high bit depth is enabled for video data, means for coding a value for a syntax element representative of the high bit depth for one or more parameters of the video data when the value for the syntax element indicates that the high bit depth is enabled, means for coding values for the parameters such that the values for the parameters have bit depths based on the value for the syntax element representative of the high bit depth when the value for the syntax element indicates that the high bit depth is enabled, and means for coding the video data based at least in part on the values for the parameters when the value for the syntax element indicates that the high bit depth is enabled.

In another example, a computer-readable storage medium (e.g., a non-transitory computer-readable storage medium) has stored thereon instructions that, when executed, cause a processor to code a value for a syntax element representative of whether a high bit depth is enabled for video data, when the value for the syntax element indicates that the high bit depth is enabled: code a value for a syntax element representative of the high bit depth for one or more parameters of the video data, code values for the parameters such that the values for the parameters have bit depths based on the value for the syntax element representative of the high bit depth, and code the video data based at least in part on the values for the parameters.

The details of one or more examples are set forth in the accompanying drawings and the description below. Other features, objects, and advantages will be apparent from the description and drawings, and from the claims.

DETAILED DESCRIPTION

Figure 1:
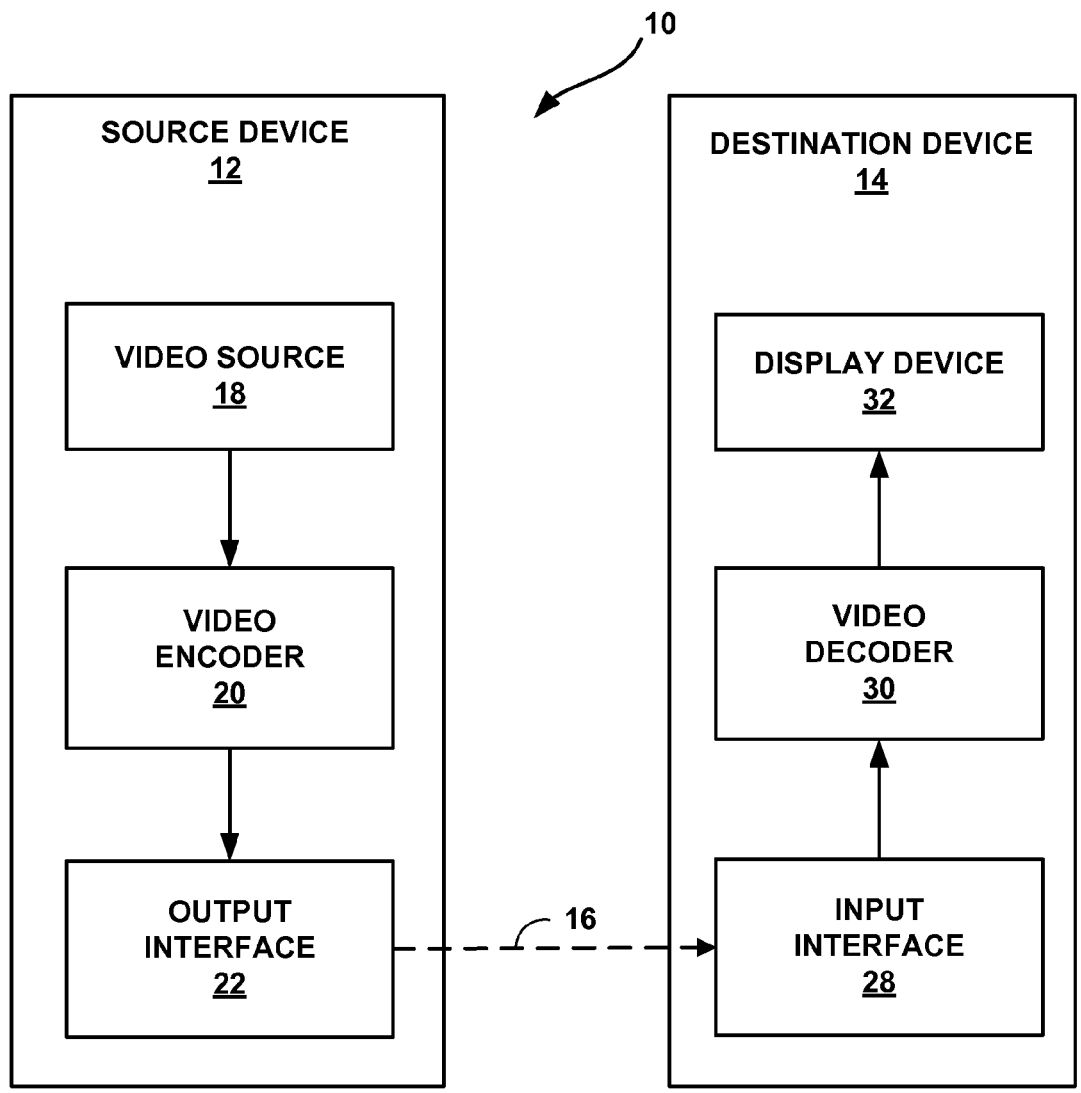
FIG. 1 is a block diagram illustrating an example video encoding and decoding system that may utilize techniques for high precision explicit weighted prediction.

In general, the techniques of this disclosure relate to high precision explicit weighted prediction. For example, these techniques may be used in a High Efficiency Video Coding (HEVC) Range Extension. HEVC is described in ITU-T H.265, SERIES H: AUDIOVISUAL AND MULTIMEDIA SYSTEMS, Infrastructure of Audiovisual Services—Coding of Moving Video, "High Efficiency Video Coding," Apr. 2013 (hereinafter, "H.265"). Various extensions to HEVC have been proposed. One such extension is the HEVC Range Extension, described in "High Efficiency Video Coding (HEVC) Range Extensions text specification: Draft 4," JCTVC-N1005_v3, August 2013 (hereinafter, "JCTVC-N1005").

H.265 specifies a main profile version I, which describes 8-bit and 10-bit codecs. Parameters related to explicit weighted prediction in H.265 are restricted to the 8-bit codec. However, as proposed for the HEVC Range Extension, input video can be up to 16-bit, which makes the 8-bit explicit weighted prediction parameters insufficient. This disclosure describes enhanced explicit weighted prediction techniques that can be used to match the bit depth of explicit weighted prediction parameters to the bit depth of input video.

Section 7.3.6.3 of JCTVC-N1005 specifies syntax for weighted prediction parameters as shown in Table 1 below. The weighted prediction parameters, which in Table 1 form part of a prediction weight table (pred_weight_table), may be signaled in a slice header.

TABLE 1

|  | Descriptor |
| --- | --- |
| pred_weight_table( ) { |  |
|   luma_log2_weight_denom | ue(v) |
|   if( ChromaArrayType != 0 ) |  |
|     delta_chroma_log2_weight_denom | se(v) |
|   for( i = 0; i <= num_ref_idx_l0_active_minus1; i++ ) |  |
|     luma_weight_l0_flag[ i ] | u(1) |
|   if( ChromaArrayType != 0 ) |  |
|     for( i = 0; i <= num_ref_idx_l0_active_minus1; i++ ) |  |
|       chroma_weight_l0_flag[ i ] | u(1) |
|   for( i = 0; i <= num_ref_idx_l0_active_minus1; i++ ) { |  |
|     if( luma_weight_l0_flag[ i ] ) { |  |

TABLE 1-continued

|  | Descriptor |
| --- | --- |
|       delta_luma_weight_l0[ i ] | se(v) |
|       luma_offset_l0[ i ] | se(v) |
|     } |  |
|     if( chroma_weight_l0_flag[ i ] ) |  |
|       for( j = 0; j < 2; j++ ) { |  |
|         delta_chroma_weight_l0[ i ][ j ] | se(v) |
|         delta_chroma_offset_l0[ i ][ j ] | se(v) |
|       } |  |
|   } |  |
|   if( slice_type = = B ) { |  |
|     for( i = 0; i <= num_ref_idx_l1_active_minus1; i++ ) |  |
|       luma_weight_l1_flag[ i ] | u(1) |
|     if( ChromaArrayType != 0 ) |  |
|       for( i = 0; i <= num_ref_idx_l1_active_minus1; i++ ) |  |
|         chroma_weight_l1_flag[ i ] | u(1) |
|     for( i = 0; i <= num_ref_idx_l1_active_minus1; i++ ) { |  |
|       if( luma_weight_l1_flag[ i ] ) { |  |
|         delta_luma_weight_l1[ i ] | se(v) |
|         luma_offset_l1[ i ] | se(v) |
|       } |  |
|       if( chroma_weight_l1_flag[ i ] ) |  |
|         for( j = 0; j < 2; j++ ) { |  |
|           delta_chroma_weight_l1[ i ][ j ] | se(v) |
|           delta_chroma_offset_l1[ i ][ j ] | se(v) |
|         } |  |
|     } |  |
|   } |  |
| } |  |

JCTVC-N1005, in section 7.4.7.3, defines semantics for the syntax elements of Table 1 as follows:

luma_log2_weight_denom is the base 2 logarithm of the denominator for all luma weighting factors. The value of luma_log2_weight_denom shall be in the range of 0 to 7, inclusive.

delta_chroma_log2_weight_denom is the difference of the base 2 logarithm of the denominator for all chroma weighting factors.

The variable ChromaLog2WeightDenom is derived to be equal to luma_log2_weight_denom+delta_chroma_log2_weight_denom, and the value shall be in the range of 0 to 7, inclusive.

luma_weight_l0_flag[i] equal to 1 specifies that weighting factors for the luma component of list 0 prediction using RefPicList0[i] are present. luma_weight_l0_flag[i] equal to 0 specifies that these weighting factors are not present.

chroma_weight_l0_flag[i] equal to 1 specifies that weighting factors for the chroma prediction values of list 0 prediction using RefPicList0[i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList0[i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to $2^{luma\_log2\_weight\_denom}$.

luma_offset_l0[i] is the additive offset applied to the luma prediction value for list 0 prediction using RefPicList0[i].

The value of luma_offset_l0[i] shall be in the range of −128 to 127, inclusive. When luma_weight_l0_flag[i] is equal to 0, luma_offset_l0[i] is inferred as equal to 0.

delta_chroma_weight_l0[i][j] is the difference of the weighting factor applied to the chroma prediction values for list 0 prediction using RefPicList0[i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] shall be in the range of −128 to 127, inclusive. When chroma_weight_l0_flag[i] is equal to 0, ChromaWeightL0[i][j] is inferred to be equal to $2^{ChromaLog2WeightDenom}$.

delta_chroma_offset_l0[i][j] is the difference of the additive offset applied to the chroma prediction values for list 0 prediction using RefPicList0[i] with j equal to 0 for Cb and j equal to 1 for Cr.

The variable ChromaOffsetL0[i][j] is derived as follows:

ChromaOffsetL0*[i][j]*=Clip3(−128,127,(delta_chroma_offset_l0*[i][j]*−((128*ChromaWeightL1*[i][j]*)>>ChromaLog2WeightDenom)+128))  (7-50)

The value of delta_chroma_offset_l0[i][j] shall be in the range of −512 to 511, inclusive. When chroma_weight_l0_flag[i] is equal to 0, ChromaOffsetL0[i][j] is inferred to be equal to 0.

luma_weight_l1_flag[i], chroma_weight_l1_flag[i], delta_luma_weight_l1[i], luma_offset_l1[i], delta_chroma_weight_l1[i][j], and delta_chroma_offset_l1[i][j] have the same semantics as luma_weight_l0_flag[i], chroma_weight_l0_flag[i], delta_luma_weight_l0[i], luma_offset_l0[i], delta_chroma_weight_l0[i][j], and delta_chroma_offset_l0[i][j], respectively, with l0, L0, list 0, and List0 replaced by l1, L1, list 1, and List1, respectively.

The variable sumWeightL0Flags is derived to be equal to the sum of luma_weight_l0_flag[i]+2*chroma_weight_l0_flag[i], for i=0 . . . num_ref_idx_l0_active_minus1.

When slice_type is equal to B, the variable sumWeightL1Flags is derived to be equal to the sum of luma_weight_l1_flag[i]+2*chroma_weight_l1_flag[i], for i=0 . . . num_ref_idx_l1_active_minus1.

JCTVC-N1005 requires, for bitstream conformance, that, when slice_type is equal to P, sumWeightL0Flags shall be less than or equal to 24, and when slice_type is equal to B, the sum of sumWeightL0Flags and sumWeightL1Flags shall be less than or equal to 24.

Section 8.5.3.3.4.3 of JCTVC-N1005 specifies the explicit weighted sample prediction process as:

Inputs to this process are:
two variables nPbW and nPbH specifying the width and the height of the luma prediction block,
two (nPbW)×(nPbH) arrays predSamplesL0 and predSamplesL1,
the prediction list utilization flags, predFlagL0, and predFlagL1,
the reference indices, refIdxL0 and refIdxL1,
a variable cIdx specifying colour component index,
a bit depth of samples, bitDepth.

Output of this process is the (nPbW)×(nPbH) array predSamples of prediction sample values.

The variable shift1 is set equal to Max(2, 14−bitDepth). The variables log2Wd, o0, o1, and w0, w1 are derived as follows:

If cIdx is equal to 0 for luma samples, the following applies:

log2*Wd*=luma_log2_weight_denom+shift1  (8-243)

*w*0=LumaWeight*L*0[refIdxL0]  (8-244)

*w*1=LumaWeight*L*1[refIdxL1]  (8-245)

*o*0=luma_offset_*l*0[refIdxL0]*(1<<(bitDepth−8))  (8-246)

*o*1=luma_offset_*l*1[refIdxL1]*(1<<(bitDepth−8))  (8-247)

Otherwise (cIdx is not equal to 0 for chroma samples), the following applies:

log2*Wd*=ChromaLog2WeightDenom+shift1  (8-248)

*w*0=ChromaWeight*L*0[refIdxL0][cIdx−1]  (8-249)

*w*1=ChromaWeight*L*1[refIdxL1][cIdx−1]  (8-250)

*o*0=ChromaOffset*L*0[refIdxL0][cIdx−1]*(1<<(bitDepth−8))  (8-251)

*o*1=ChromaOffset*L*1[refIdxL1][cIdx−1]*(1<<(bitDepth−8))  (8-252)

The prediction sample predSamples[x][y] with x=0 . . . nPbW−1 and y=0 . . . nPbH−1 are derived as follows:

If the predFlagL0 is equal to 1 and predFlagL1 is equal to 0, the prediction sample values are derived as follows:

if(log2*Wd*>=1)

predSamples*[x][y]*=Clip3(0,(1<<bitDepth)−1,(((predSamplesL0*[x][y]*\*w0+$2^{log2Wd}$−1)>>log2*Wd*)+o0)  (8-253)

else predSamples*[x][y]*=Clip3(0,(1<<bitDepth)−1,predSamplesL0*[x][y]*\*w0+o0)

Otherwise, if the predFlagL0 is equal to 0 and predFlagL1 is equal to 1, the prediction sample values are derived as follows:

if(log2*Wd*>=1)

predSamples*[x][y]*=Clip3(0,(1<<bitDepth)−1,((predSamplesL1*[x][y]*\*w1+$2^{log2Wd}$−1)>>log2*Wd*)+o1)  (8-254)

else predSamples*[x][y]*=Clip3(0,(1<<bitDepth)−1,predSamplesL1*[x][y]*\*w1+o1)

Otherwise (predFlagL0 is equal to 1 and predFlagL1 is equal to 1), the prediction sample values are derived as follows:

predSamples*[x][y]*=Clip3(0,(1<<bitDepth)−1,(predSamplesL0*[x][y]*\*w0+predSamplesL1*[x][y]*\*w1+((o0+o1+1)<<log2*Wd*))>>(log2*Wd*+1))  (8-255)

This disclosure describes techniques that may improve explicit weighted prediction of JCTVC-N1005. For instance, the techniques of this disclosure may be implemented for high precision explicit weighted prediction. High precision explicit weighted prediction may improve coding efficiency for high bit depth input video. In accordance with these techniques, a video coder (e.g., a video encoder or a video decoder) may adaptively apply a right shift according to the bit depth of input data to guarantee no overflow using 16-bit multiplication. Furthermore, the techniques of this disclosure may include signaling a value for a syntax element (such as a flag) indicative of whether high precision explicit weighted prediction is used.

FIG. 1 is a block diagram illustrating an example video encoding and decoding system 10 that may utilize techniques for high precision explicit weighted prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablets, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for high precision explicit weighted prediction. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for high precision explicit weighted prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC continues to develop the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCUs) (also referred to as "coding tree units") that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be configured to perform high precision explicit weighted prediction. For instance, video encoder 20 and video decoder 30 may be configured to code video data in accordance with certain modified semantics to the syntax elements of Table 1 discussed above. As an example, the modified semantics may include any or all of the semantics shown below. In the semantics for syntax elements below, underlined text represents differences relative to the semantics set forth in JCTVC-N1005.

luma_log2_weight_denom is the base 2 logarithm of the denominator for all luma weighting factors. The value of luma_log2_weight_denom shall be in the range of 0 to bitDepth−1, inclusive.

delta_chroma_log2_weight_denom is the difference of the base 2 logarithm of the denominator for all chroma_weighting factors.

The variable ChromaLog2WeightDenom is derived to be equal to luma_log2 weight_denom+delta_chroma_log2_weight_denom, and the value shall be in the range of 0 to bitDepth−1, inclusive.

delta_luma_weight_l0[i] is the difference of the weighting factor applied to the luma prediction value for list 0 prediction using RefPicList0[i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of $-2^{bitDepth-1}$ to $2^{bitDepth-1}-1$, inclusive. When luma_weight_l0_flag[i] is equal to 0, LumaWeightL0[i] is inferred to be equal to $2^{luma\_log2\_weight\_denom}$.

luma_offset_l0[i] is the additive offset applied to the luma prediction value for list 0 prediction using RefPicList0[i]. The value of luma_offset_l0[i] shall be in the range of $-2^{bitDepth-1}$ to $2^{bitDepth-1}-1$, inclusive. When luma_weight_l0_flag[i] is equal to 0, luma_offset_l0[i] is inferred as equal to 0.

delta_chroma_weight_l0[i][j] is the difference of the weighting factor applied to the chroma prediction values for list 0 prediction using RefPicList0[i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] shall be in the range of $-2^{bitDepth-1}$ to $2^{bitDepth-1}-1$, inclusive. When chroma_weight_l0_flag[i] is equal to 0, ChromaWeightL0[i][j] is inferred to be equal to 2ChromaLog2WeightDenom.

delta_chroma_offset_l0[i][j] is the difference of the additive offset applied to the chroma prediction values for list 0 prediction using RefPicList0[i] with j equal to 0 for Cb and j equal to 1 for Cr.

The variable ChromaOffsetL0[i][j] is derived as follows:

ChromaOffsetL0[i][j]=Clip3(−$2^{bitDepth-1}$, $2^{bitDepth-1}$−1,(delta_chroma_offset_l0[i][j]−(($2^{bitDepth-1}$*ChromaWeightL0[i][j])>> ChromaLog2WeightDenom)+$2^{bitDepth-1}$)) (7-50)

The value of delta_chroma_offset_l0[i][j] shall be in the range of $-2^{bitDepth+1}$ to $2^{bitDepth+1}-1$, inclusive. When chroma_weight_l0_flag[i] is equal to 0, ChromaOffsetL0[i][j] is inferred to be equal to 0.

delta_luma_weight_l1[i], luma_offset_l1[i], delta_chroma_weight_l1[i][j], and delta_chroma_offset_l1[i][j] have the same semantics as delta_luma_weight_l0[i], luma_offset_l0[i], delta_chroma_weight_l0[i][j], and delta_chroma_offset_l0[i][j], respectively, with l0, L0, list 0, and List0 replaced by l1, L1, list 1, and List1, respectively.

In addition or in the alternative, video encoder 20 and video decoder 30 may be configured to implement a high precision explicit weighted sample prediction process as described below. Underlined text in the discussion below represents changes relative to JCTVC-N1005. Removals from the proposal of JCTVC-N1005 are not necessarily emphasized in the discussion below, but can be observed by comparing this discussion with the discussion of JCTVC-N1005 presented above.

The variables log2Wd, o0, o1, and w0, w1 are derived as follows:
If cIdx is equal to 0 for luma samples, the following applies:

log2Wd=luma_log2 weight_denom+shift1 (8-243)

w0=LumaWeightL0[refIdxL0] (8-244)

w1=LumaWeightL1[refIdxL1] (8-245)

o0=luma_offset_l0[refIdxL0] (8-246')

o1=luma_offset_l1[refIdxL1] (8-247')

Otherwise (cIdx is not equal to 0 for chroma samples), the following applies:

log2Wd=ChromaLog2WeightDenom+shift1 (8-248)

w0=ChromaWeightL0[refIdxL0][cIdx−1] (8-249)

w1=ChromaWeightL1[refIdxL1][cIdx−1] (8-250)

o0=ChromaOffsetL0[refIdxL0][cIdx−1] (8-251')

o1=ChromaOffsetL1[refIdxL1][cIdx−1] (8-252')

JCTVC-N1005 specifies formulas (8-246), (8-247), (8-251) and (8-252) as follows:

o0=luma_offset_l0[refIdxL0]*(1<<(bitDepth−8)) (8-246)

o1=luma_offset_l1[refIdxL1]*(1<<(bitDepth−8)) (8-247)

o0=ChromaOffsetL0[refIdxL0][cIdx−1]*(1<<(bit-Depth−8)) (8-251)

o1=ChromaOffsetL1[refIdxL1][cIdx−1]*(1<<(bit-Depth−8)) (8-252)

As can be seen through comparison, in formulas (8-246'), (8-247'), (8-251') and (8-252') of this disclosure, the variables o0 and o1 may be calculated without multiplying by (1<<(bitDepth−8)), as specified in JCTVC-N1005. Similarly, the variables o0 and o1 may be calculated without calculating (1<<(the bit depth minus 8)), where "<<" represents the bitwise left-shift operator.

Video encoder 20 and video decoder 30 may be configured to code data indicative of whether high precision weighted prediction is enabled, e.g., for a sequence of pictures. For example, video encoder 20 and video decoder 30 may be configured to code a syntax element of a sequence parameter set (SPS), where the value of the syntax element indicates whether high precision weighted prediction (that is, a high bit depth) is enabled for video data. Table 2 below presents syntax that may be used for such data indicative of whether high precision weighted prediction is enabled. In accordance with the example of FIG. 2, video encoder 20 and video decoder 30 may code a flag to indicate whether the high precision weighted prediction is used in an SPS RBSP syntax. The flag can also be signaled in other high level syntax body, such as a video parameter set (VPS), a picture parameter set (PPS), a slice header, a block header, or the like. In the example of Table 2, underlined text represents additions relative to the syntax of HEVC and JCTVC-N1005.

TABLE 2

| | Descriptor |
|---|---|
| seq_parameter_set_rbsp( ) { | |
| ... | |
|   bit_depth_luma_minus8 | ue(v) |
|   bit_depth_chroma_minus8 | ue(v) |
|   if (BitDepth$_Y$ > 10 || BitDepth$_C$ > 10) | |
|     <u>use_high_precision_weighted_prediction_flag</u> | <u>u(1)</u> |
|   log2_max_pic_order_cnt_lsb_minus4 | ue(v) |

Semantics for the use_high_precision_weighted_prediction_flag may be defined as follows:

use_high_precision_weighted_prediction_flag equal to 1 specifies that high precision explicit weighted prediction in this disclosure is used. use_high_precision_weighted_prediction_flag equal to 0 specifies that high precision explicit weighted prediction in this disclosure is not used and the HEVC range extension draft (per JCTVC-N1005) is used. When not presented, it is inferred to be 0.

As can be seen in the example of Table 2, if the bit depth for luminance (luma or 'Y') is greater than 10 or if the bit depth for chrominance (chroma or 'C') is greater than 10, the sequence parameter set may include the use_high_precision_weighted_prediction_flag syntax element, which may indicate whether to use high precision weighted prediction (that is, a high bit depth). Thus, a "high bit depth" for a weighted prediction process may correspond to a bit depth that is greater than ten (10) bits.

Furthermore, video encoder 20 and video decoder 30 may be configured to operate according to the following modifications to JCTVC-N1005. In section 8.5.3.3.4.3 of JCTVC-N1005, shift1 is set equal to Max(2, 14−bitDepth). In the worst case, the predSamples[x][y] can be up to: bitDepth (input bit depth)+shift1+1 (scaling from interpolation)+1 (sign bit from interpolation).

Table 3 below lists the worst case sample bit depth, as modified to accommodate the techniques of this disclosure (where underlined text represents modifications to the syntax described in JCTVC-N1005):

TABLE 3

| Input bit depth | shift 1 | Sample bit depth |
|---|---|---|
| 16 | 2 | <u>20</u> |
| 15 | 2 | <u>19</u> |
| 14 | 2 | <u>18</u> |
| 13 | 2 | <u>17</u> |
| 12 | 2 | 16 |
| 11 | 3 | 16 |

Then, in the worst case, in formula (8-253) described above, predSamplesL0[x][y]*w0 would not otherwise be implemented using 16 bit multiplication. In accordance with the techniques of this disclosure, however, w0 may be restricted to Min(bitDepth, 16−shift1-2) (bit).

In another example, video encoder 20 and video decoder 30 may be configured to use offset parameters having extended precision, but use weighting parameters having the same precision as in JCTVC-N1005. That is, only the semantics of luma_offset_l0, luma_offset_l1, delta_chroma_offset_l0, and delta_chroma_offset_l1 may be changed according to the various examples described above, whereas the semantics of other syntax elements may be kept unchanged relative to JCTVC-N1005. Thus, video encoder 20 and video decoder 30 may code video data using one or more offset parameters having extended precision (e.g., one or more of luma_offset_l0, luma_offset_l1, delta_chroma_offset_l0, and delta_chroma_offset_l1), and weighting parameters having precisions defined in JCTVC-N1005.

Offset parameters, such as luma_offset_l0, luma_offset_l1, delta_chroma_offset_l0, and delta_chroma_offset_l1, may be used to offset prediction samples of a block by a particular amount. Such offsets may be beneficial when global or regional changes occur in a current picture, relative to a set of reference samples (e.g., a reference picture or a portion of the reference picture). For example, if illumination increases or decreases globally or regionally in a current picture relative to a reference picture, such as during a scene fade-in or fade-out or a sudden flash of light such as a lightning strike, it may be beneficial to introduce offsets to samples in the luminance values of the reference picture, rather than attempting to identify a different reference picture. Introducing the offset may decrease a residual value for a block of the current picture, which may reduce the bitrate of the video data.

Whereas JCTVC-N1005 included a fixed range of possible values for such offsets (that is, fixed bit depths for signaling such offsets), the techniques of this disclosure allow for dynamically adjusting the bit depth of such offsets. That is, video encoder 20 may signal one or more values representative of the bit depth for the offset parameters, as well as whether the high bit depth is enabled (that is, whether a high precision weighted prediction process is enabled). Video decoder 30, similarly, may use the signaled values representative of the bit depth to correctly decode the bitstream. More particularly, video decoder 30 may determine which bits of the bitstream apply to the offset parameters and when the bits begin applying to a subsequent, different syntax element. For example, if the bit depth is 8 bits, and video decoder 30 has decoded 8 bits for an offset parameter, video decoder 30 may determine that a subsequent bit applies to a different syntax element, and not to the offset parameter.

Allowing for a higher bit depth for offset parameters than the bit depths of such parameters specified in JCTVC-N1005 may yield certain advantages. For example, the coding efficiency (that is, the number of bits included in the bitstream) may be improved when input video data has a relatively high bit depth. However, when the input video data has a relatively low bit depth or when the number of bits used for the offset parameters does not yield significant coding gains (as shown by, e.g., rate-distortion metrics), video encoder 20 may disable the high bit depth.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
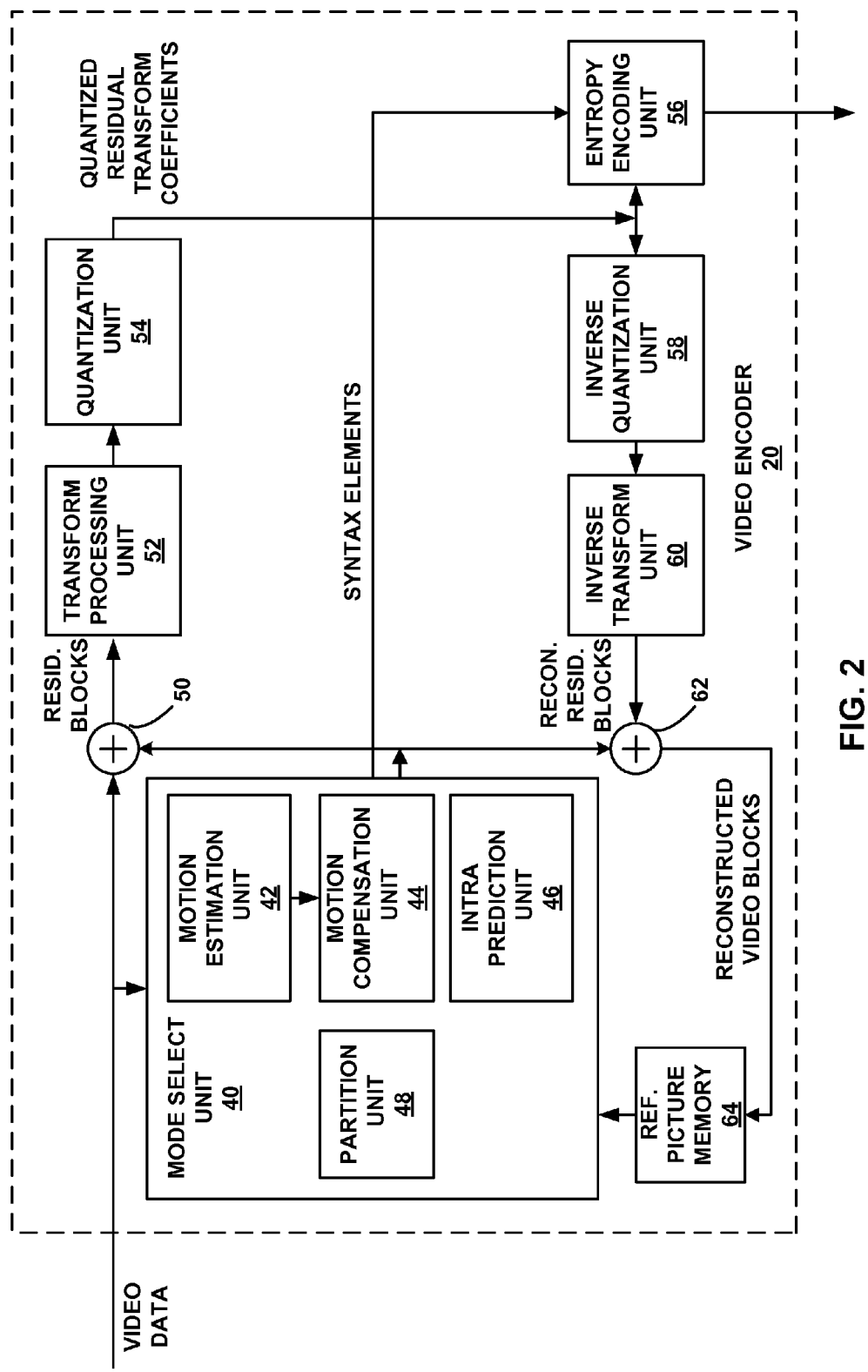
FIG. 2 is a block diagram illustrating an example of a video encoder that may implement techniques for high precision explicit weighted prediction.

FIG. 2 is a block diagram illustrating an example of video encoder 20 that may implement techniques for high precision explicit weighted prediction. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Motion compensation unit 44 may further be configured to apply offsets to prediction samples during motion compensation. For instance, mode select unit 40 may cause motion compensation unit 44 to apply offsets to luminance and/or chrominance samples of a reference block (or to an entire reference picture), which may improve prediction from the reference block or reference picture for a current picture. In accordance with the techniques of this disclosure, mode select unit 40 may select offsets of either a conventional bit depth or of a relatively high bit depth. When the offsets are of the high bit depth, video encoder 20 may encode a value for a syntax element (e.g., of a sequence parameter set (SPS)) indicating that the high bit depth is enabled.

As an example, video encoder 20 may be configured to apply offsets to luminance prediction data of one or more reference pictures. If the current picture is a uni-directionally predicted picture (that is, a P-picture), video encoder 20 may apply the offsets to one or more reference pictures in reference picture list 0. Video encoder 20 may signal values for parameters representative of offsets to be applied to one or more reference pictures in reference picture list 0. That is, video encoder 20 may signal values for luma_offset_l0[i], where i is in the range of all reference pictures in reference picture list 0. Similarly, if the current picture is a B-picture, video encoder 20 may signal values for offset parameters of reference pictures in both reference picture list 0 and reference picture list 1, where the offset parameters for reference pictures of reference picture list 0 may correspond to luma_offset_l0[i] and the offset parameters for reference pictures of reference picture list 1 may correspond to luma_offset_l1[i].

Similarly, video encoder 20 may encode values for offset parameters for chrominance samples. For example, video encoder 20 may encode values for delta_chroma_offset_l0 [i][j] parameters and, if the current picture is a B-picture, delta_chroma_offset_l1[i][j] parameters. Again, "l0" represents reference picture list 0 while "l1" represents reference picture list 1, and 'i' is in the range of pictures in the respective reference picture list. The variable 'j' for these parameters represents a value based on a context index "cIdx," namely, cIdx−1. The cIdx value may be zero (0) for luma samples and non-zero for chroma samples.

Video encoder 20 may signal the values for the luma_offset_l0[i], luma_offset_l1[i], delta_chroma_offset_l0[i][j], and delta_chroma_offset_l1[i][j] parameters in a prediction weight table (pred_weight_table), which may form part of a slice header.

Accordingly, motion compensation unit 44 may calculate values for variables o0 and o1 according to formulas (8-246'), (8-247'), (8-251') and (8-252'), as discussed above with respect to FIG. 1. Motion compensation unit 44 may apply the offsets to reference blocks determined from respective reference pictures. Accordingly, when video encoder 20 forms and encodes residual blocks, summer 50 may calculate the residual blocks as pixel-by-pixel (or sample-by-sample) differences between a current, uncoded block and the reference block formed by motion compensation unit 44 (where motion compensation unit 44 may have applied the offsets to the reference block). As discussed above, mode select unit 40 may cause motion compensation unit 44 to try various values for the offsets and select values for the offset parameters that yield the best rate-distortion characteristics. Moreover, when high bit depth is enabled, mode select unit 40 may attempt values for the offset parameters within ranges defined by the high bit depth.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The quantization process may also be referred to as a "scaling" process, and thus, quantized transform coefficients may also be referred to as "scaled transform coefficients." The degree of quantization (or scaling) may be modified by adjusting a quantization parameter. In some examples, entropy encoding unit 56 may then perform a scan of the matrix including the quantized transform coefficients.

Following quantization, entropy encoding unit 56 entropy codes the scanned, quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to encode a value for a syntax element representative of whether a high bit depth is enabled for video data, and when the value for the syntax element indicates that the high bit depth is enabled: encode a value for a syntax element representative of a bit depth for one or more parameters of the video data, encode values for the parameters such that the values for the parameters have bit depths based on the value for the syntax element representative of the bit depth, and encode the video data based at least in part on the values for the parameters.

Figure 3:
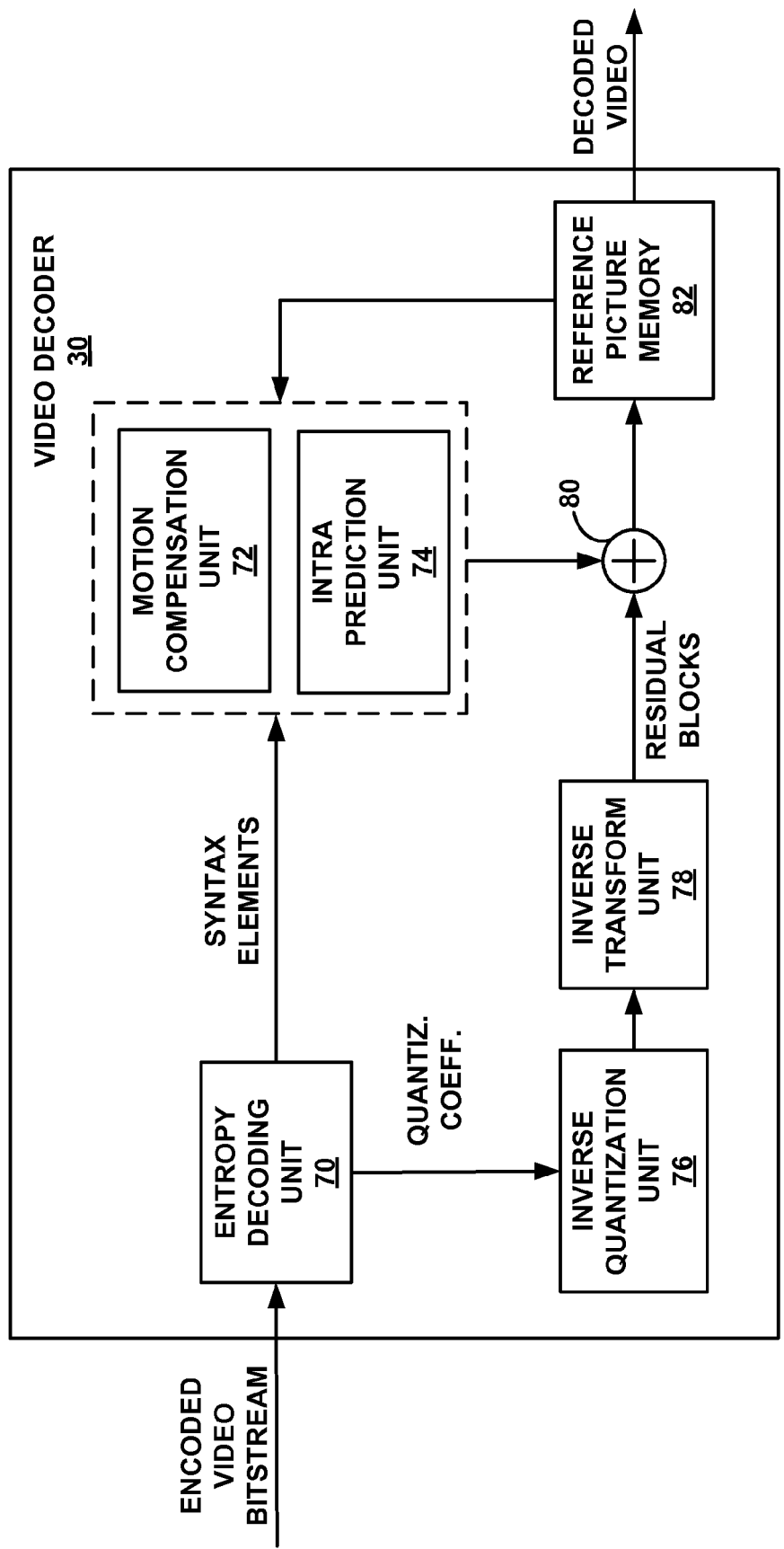
FIG. 3 is a block diagram illustrating an example of a video decoder that may implement techniques for high precision explicit weighted prediction.

FIG. 3 is a block diagram illustrating an example of video decoder 30 that may implement techniques for high precision explicit weighted prediction. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, video decoder 30 may decode syntax elements of an SPS to determine whether a high bit depth is enabled for video data. When the high bit depth is enabled, video decoder 30 may decode values for offset parameters having bit depths that are based on a signaled bit depth value. That is, the SPS may signal whether the high bit depth is enabled and, when the high bit depth is enabled, bit depths for luminance and/or chrominance offset parameters.

Assuming that the SPS indicates that the high bit depth (e.g., bit depths greater than 10 for luminance and/or chrominance offset parameters) is enabled, video decoder 30 may further decode values for the offset parameters. Video decoder 30 may decode a slice header of a slice that includes a prediction weight table (pred_weight_table), such as Table 1, which may signal the values for the offset parameters. In particular, video decoder 30 may use the signaled bit depth values (e.g., signaled according to Table 2 above) to decode the values for the offset parameters. For example, video decoder 30 may use a signaled bit depth to determine portions of the bitstream that apply to an offset parameter as opposed to a subsequent syntax element of the slice header.

After decoding the values for the offset parameters, video decoder 30 may use the offset parameters to calculate values for offset variables for luminance and/or chrominance samples. The offset variables may be, for example, variables o0 and o1 as discussed above. Video decoder 30 may calculate values for variables o0 and o1 using formulas (8-246'), (8-247'), (8-251') and (8-252'), as discussed above with respect to FIG. 1. Then, motion compensation unit 72 may apply these offsets to respective reference samples to produce a predicted block. That is, motion compensation unit 72 may apply the offset value of o0 to reference samples from reference pictures in reference picture list 0 and the offset value of o1 to reference samples from reference pictures in reference picture list 1. In accordance with the techniques of this disclosure, video decoder 30 may calculate values for variables o0 and o1 without calculating (1<<(the bit depth minus 8)) and multiplying this value by the value of the signaled offset parameter, contrary to the techniques of JCTVC-N1005.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block (which may include offsetting reference samples using offsets that may have high bit depths, as discussed above) for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to decode a value for a syntax element representative of whether a high bit depth is enabled for the video data, and when the value for the syntax element indicates that the high bit depth is enabled: decode a value for a syntax element representative of a bit depth for one or more parameters of the video data, decode values for the parameters such that the values for the parameters have bit depths based on the value for the syntax element representative of the bit depth, and decode the video data based at least in part on the values for the parameters.

Figure 4:
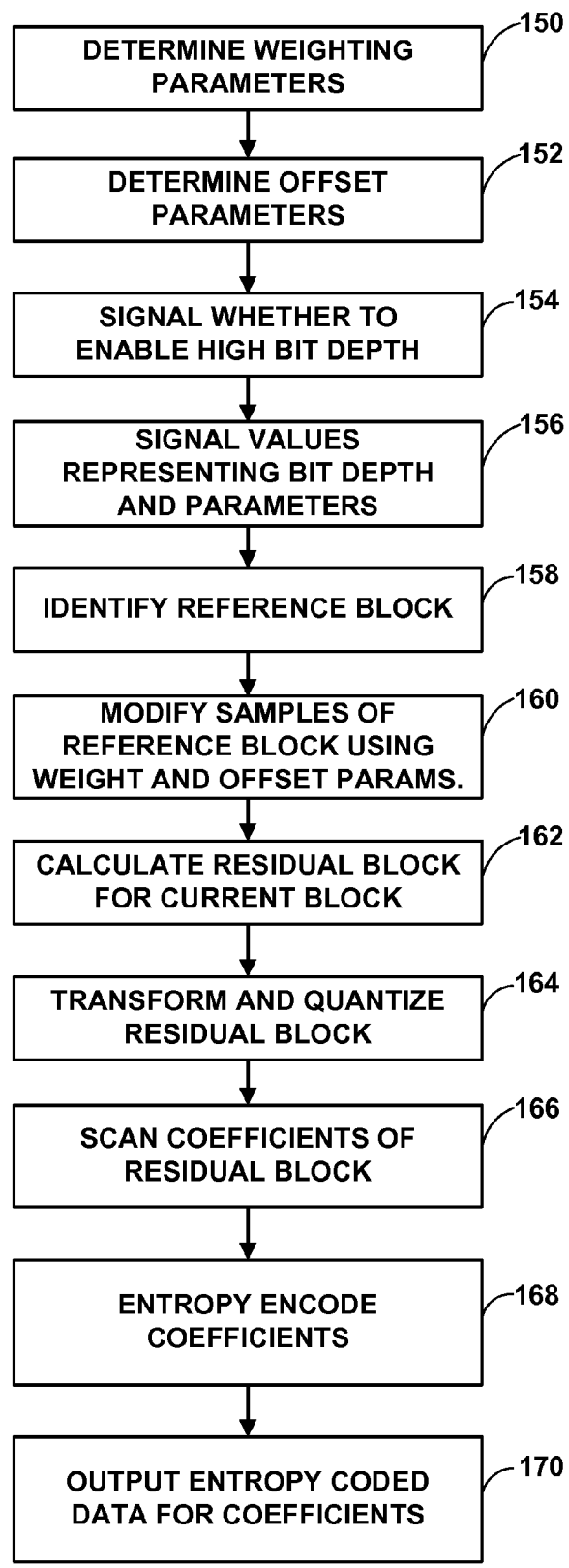
FIG. 4 is a flowchart illustrating an example method for encoding a current block according to the techniques of this disclosure.

FIG. 4 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 4.

In this example, video encoder 20 initially determines weighting parameters (150) and offset parameters (154). The weighting and/or offset parameters may have a relatively high bit depth, e.g., a bit depth over ten (10) bits. Accordingly, video encoder 20 may signal (e.g., in a syntax element of an SPS, such as use_high_precision_weighted_prediction_flag) whether to enable a high bit depth (154). Furthermore, video encoder 20 may signal values representing bit depths for the weighting and/or offset parameters, as well as the values of the parameters themselves (156). For example, video encoder 20 may encode values for luma_offset_l0[i] parameters, luma_offset_l1[i] parameters, delta_chroma_offset_l0[i][j] parameters, and delta_chroma_offset_l1[i][j] parameters.

Video encoder 20 may then identify a reference block for a current block (158). For example, motion estimation unit 42 may perform a motion search for a matching block in a reference picture. The matching block, used as a reference block, may be the block that exhibits the lowest error value, e.g., as measured by SAD, SSD, MAD, MSD, or other such error metrics. Motion compensation unit 44 may then modify samples of the reference block using the weighting and offset parameters (160). For instance, motion compensation unit 44 may calculate values for variable o0 and o1 according to formulas (8-246'), (8-247'), (8-251') and (8-252'), and thus, without calculating (1<<(bitDepth−8)). Again, the weighting and/or offset parameters may have a relatively high bit depth. Accordingly, motion compensation unit 44 may offset samples of the reference block using, for example, an offset parameter having more than ten bits. In some examples, the offset parameter may be a sixteen bit value. Video encoder 20 may use the modified reference block as a predicted block for the current block.

Video encoder 20 may then calculate a residual block for the current block, e.g., to produce a transform unit (TU) (162). To calculate the residual block, video encoder 20 may calculate a difference between the original, uncoded block and the predicted block for the current block. Video encoder 20 may then transform and quantize coefficients of the residual block (164). Next, video encoder 20 may scan the quantized transform coefficients of the residual block (166). During the scan, or following the scan, video encoder 20 may entropy encode the coefficients (168). For example, video encoder 20 may encode the coefficients using CAVLC or CABAC. Video encoder 20 may then output the entropy coded data of the block (170).

In this manner, the method of FIG. 4 represents an example of a method for encoding video data including determining whether to enable a high bit depth for video data, and after determining to enable the high bit depth: encoding a value for a syntax element indicating that the high bit depth is enabled, encoding a value for a syntax element representative of a bit depth for one or more parameters of the video data, encoding values for the parameters such that the values for the parameters have bit depths based on the bit depth, and encoding the video data based at least in part on the values for the parameters.

Figure 5:
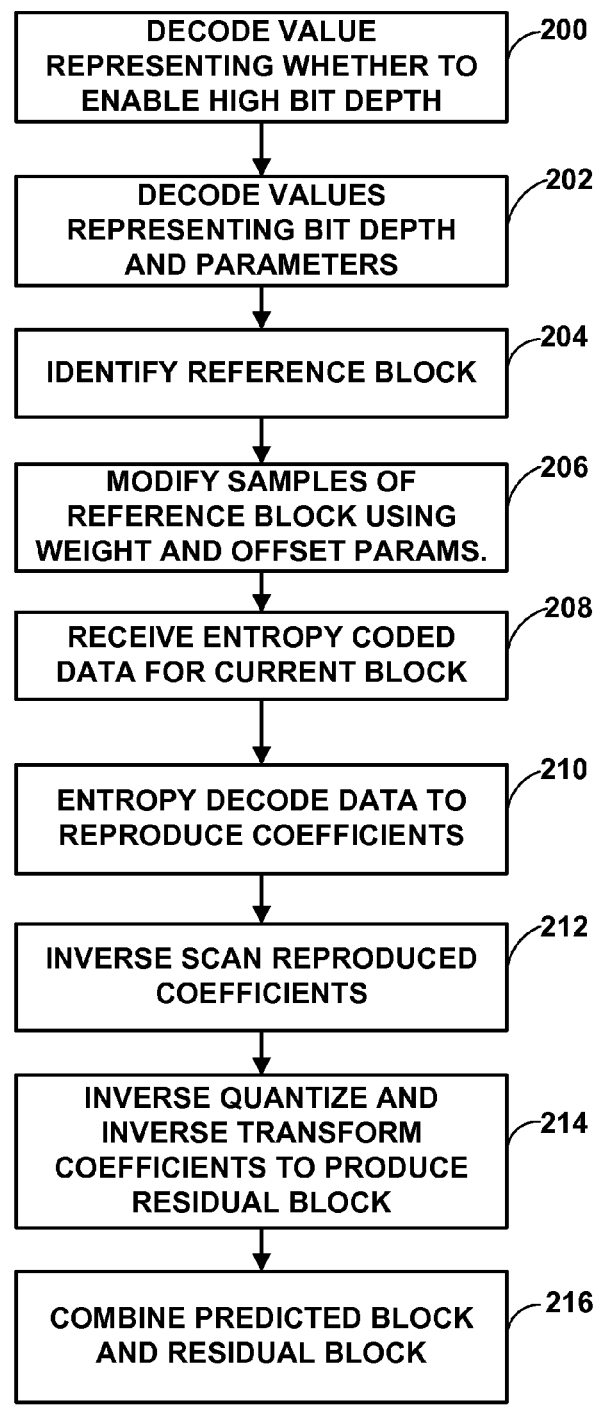
FIG. 5 is a flowchart illustrating an example method for decoding a current block of video data according to the techniques of this disclosure.

FIG. 5 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 5.

Initially, video decoder 30 may decode a value for a syntax element representative of whether to enable a high bit depth for video data (200), and thus, whether to perform high precision explicit weighted prediction. Assuming the high bit depth is enabled, video decoder 30 may decode values representing the bit depth and weighting and/or offset parameters (202). For example, video decoder 30 may decode values for luma_offset_l0[i] parameters, luma_offset_l1[i] parameters, delta_chroma_offset_l0[i][j] parameters, and delta_chroma_offset_l1[i][j] parameters. Such values may be decoded as part of a slice header, e.g., in accordance with Table 1 as described above.

Video decoder 30 may then identify a reference block for a current block (204). For example, video decoder 30 may decode motion parameters for the current block, e.g., using merge mode or advanced motion vector prediction (AMVP) mode. The motion parameters may identify one or more of a reference picture list, an index into the reference picture list, motion vector difference values, and/or a motion vector predictor of a set of candidate motion vector predictors. Video decoder 30 may then modify samples of the reference block using the weighting and offset parameters (206). For instance, motion compensation unit 72 may calculate values for variable o0 and o1 according to formulas (8-246'), (8-247'), (8-251'), and (8-252'), and thus, without calculating (1<<(bitDepth−8)). Again, the weighting and/or offset parameters may have a relatively high bit depth. Accordingly, motion compensation unit 72 may offset samples of the reference block using, for example, an offset parameter having more than ten bits. In some examples, the offset parameter may be a sixteen bit value. Video decoder 30 may use the modified reference block as a predicted block for the current block.

Video decoder 30 may also receive entropy coded data for the current block, such as entropy coded data for coefficients of a residual block corresponding to the current block (208). Video decoder 30 may entropy decode the entropy coded data to reproduce coefficients of the residual block (210). Video decoder 30 may then inverse scan the reproduced coefficients (212), to create a block of quantized transform coefficients. Video decoder 30 may then inverse quantize and inverse transform the coefficients to produce a residual block (214). Video decoder 30 may ultimately decode the current block by combining the predicted block and the residual block (216).

In this manner, the method of FIG. 5 represents an example of a method for decoding video data including decoding a value for a syntax element representative of whether a high bit depth is enabled for video data, when the value for the syntax element indicates that the high bit depth is enabled: decoding a value for a syntax element representative of a bit depth for one or more parameters of the video data, decoding values for the parameters such that the values for the parameters have bit depths based on the value for the syntax element representative of the bit depth, and decoding the video data based at least in part on the values for the parameters.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a value for a syntax element representative of whether weighted prediction having a signaled bit depth is enabled for video data;
    when the value for the syntax element indicates that the weighted prediction having the signaled bit depth is enabled:
        decoding a value for a syntax element representative of the signaled bit depth for one or more parameters of the video data, wherein the one or more parameters comprise a luma_offset_l0[i] parameter or a luma_offset_l1[i] parameter;
        decoding values for the parameters such that the values for the parameters are representative of bit depths that are based on the value for the syntax element representative of the signaled bit depth; and
        decoding the video data based at least in part on the values for the parameters, wherein decoding the video data comprises, when performing a weighted prediction process for luminance samples:
            calculating a value for a variable o0 used in the weighted prediction process as being equal to a value for a luma_offset_l0[refIdxL0] parameter, without calculating (1<<(the bit depth minus 8)); and
            calculating a value for a variable o1 used in the weighted prediction process as being equal to a value for a luma_offset_l1[refIdxL1] parameter, without calculating (1<<(the bit depth minus 8)).

2. The method of claim 1, wherein decoding the value for the syntax element representative of whether the weighted prediction having the signaled bit depth is enabled comprises decoding a value for a syntax element of a sequence parameter set (SPS) for a sequence of pictures of the video data.

3. The method of claim 1, wherein decoding a value for the luma_offset_l0[i] parameter or the luma_offset_l0[i] parameter comprises decoding a value in the range of −2 raised to (the signaled bit depth minus 1) to 2 raised to (the signaled bit depth minus 1) minus 1, inclusive.

4. The method of claim 1, wherein the one or more weighted prediction parameters further comprise a delta_chroma_offset_l0[i][j] parameter or a delta_chroma_offset_l1[i][j] parameter.

5. The method of claim 4, wherein decoding a value for the delta_chroma_offset_l0[i][j] parameter or the delta_chroma_offset_l1[i][j] parameter comprises decoding a value in the range of −2 raised to (the signaled bit depth plus 1) to 2 raised to (the signaled bit depth plus 1) minus 1 inclusive.

6. The method of claim 5, further comprising:
    deriving a value for a ChromaOffsetL0[i][j] variable according to the formula: Clip3(−2 raised to (the signaled bit depth minus 1), 2 raised to (the signaled bit depth minus 1) minus 1, (delta_chroma_offset_l0[i][j]−((2 raised to (the signaled bit depth minus 1)*ChromaWeightL0[i][j])>>ChromaLog2WeightDenom)+2 raised to (the signaled bit depth minus 1))); and
    deriving a value for a ChromaOffsetL1 [i][j] variable according to the formula: Clip3(−2 raised to (the signaled bit depth minus 1), 2 raised to (the signaled bit depth minus 1) minus 1, (delta_chroma_offset_l1[i][j] −((2 raised to (the signaled bit depth minus 1)*ChromaWeightL1[i][j])>>ChromaLog2WeightDenom)+2 raised to (the signaled bit depth minus 1))).

7. The method of claim 6, wherein decoding the video data comprises, when performing a weighted prediction process for chrominance samples:
    calculating a value for a variable o0 used in the weighted prediction process as being equal to a ChromaOffsetL0 [refIdxL0][cIdx−1] variable, without calculating (1<<(the signaled bit depth minus 8));
    calculating a value for a variable o1 used in the weighted prediction process as being equal to a ChromaOffsetL1 [refIdxL1][cIdx−1] variable, without calculating (1<<(the signaled bit depth minus 8)).

8. The method of claim 1, wherein the one or more parameters comprise the luma_offset_l0[i] parameter, the luma_offset_l1[i] parameter, a delta_chroma_offset_l0[i][j] parameter, and a delta_chroma_offset_l1[i][j] parameter.

9. The method of claim 1, wherein decoding the video data comprises adaptively performing a right shift operation according to the signaled bit depth.

10. The method of claim 1, wherein the syntax element representative of whether the weighted prediction having the signaled bit depth is enabled comprises use_high_precision_weighted_prediction_flag.

11. A method of encoding video data, the method comprising:
    determining to enable weighted prediction having a signaled bit depth for video data;
    after determining to enable the weighted prediction having the signaled bit depth:
        encoding a value for a syntax element indicating that the weighted prediction having the signaled bit depth is enabled;
        encoding a value for a syntax element representative of the signaled bit depth for one or more parameters of the video data, wherein the one or more parameters comprise a luma_offset_l0[i] parameter or a luma_offset_l1[i] parameter;
        encoding values for the parameters such that the values for the parameters are representative of bit depths that are based on the signaled bit depth; and
        encoding the video data based at least in part on the values for the parameters, wherein encoding the video data comprises, when performing a weighted prediction process for luminance samples:
            calculating a value for a variable o0 used in the weighted prediction process as being equal to a value for a luma_offset_l0[refIdxL0] parameter without calculating (1<<(the signaled bit depth minus 8)); and
            calculating a value for a variable of used in the weighted prediction process as being equal to a value for a luma_offset_l1[refIdxL1] parameter without calculating (1<<(the signaled bit depth minus 8)).

12. The method of claim 11, wherein encoding the value for the syntax element indicating that the weighted prediction having the signaled bit depth is enabled comprises encoding a value for a syntax element of a sequence parameter set (SPS) for a sequence of pictures of the video data.

13. The method of claim 11, wherein encoding a value for the luma_offset_l0[i] parameter or the luma_offset_l0[i] parameter comprises encoding a value in the range of −2 raised to (the signaled bit depth minus 1) to 2 raised to (the signaled bit depth minus 1) minus 1. inclusive.

14. The method of claim 11,
wherein the one or more weighted prediction parameters comprise a delta_chroma_offset_l0[i][j] parameter or a delta_chroma_offset_l1[i][j] parameter, and
wherein encoding a value for the delta_chroma_offset_l0 [i][j] parameter or the delta_chroma_offset_l1[i][j] parameter comprises encoding a value in the range of −2 raised to (the signaled bit depth plus 1) to 2 raised to (the signaled bit depth plus 1) minus 1 inclusive.

15. The method of claim 14, wherein encoding the video data comprises, when performing a precision weighted prediction process for chrominance samples:
calculating a value for a ChromaOffsetL0[refIdxL0] [cIdx−1] variable from the delta_chroma_offset_l0[i][j] parameter;
calculating a value for a variable o0 used in the weighted prediction process as being equal to the ChromaOffsetL0[refIdxL0 ][cIdx−1] variable, without calculating (1<<(the signaled bit depth minus 8));
calculating a value for a ChromaOffsetLl[refIdxL1] [cIdx−1] variable from the delta_chroma_offset_l1[i][j] parameter; and
calculating a value for a variable of used in the weighted prediction process as being equal to the ChromaOffsetL1[refIdxL1][cIdx−1] variable, without calculating (1<<(the signaled bit depth minus 8)).

16. The method of claim 11, wherein the one or more parameters comprise the luma_offset_l0[i] parameter, the luma_offset_l1[i] parameter, a delta_chroma_offset_l0[i][j] parameter, and a delta_chroma_offset_l1[i][j] parameter.

17. The method of claim 11, wherein the syntax element representative of whether the weighted prediction having the signaled bit depth is enabled comprises use_high_precision_weighted_prediction_flag.

18. A device for coding video data, the device comprising:
a memory configured to store video data; and
a video coder configured to:
code a value for a syntax element representative of whether a weighted prediction having a signaled bit depth is enabled for the video data, and when the value for the syntax element indicates that the weighted prediction having the signaled bit depth is enabled,
code a value for a syntax element representative of the signaled bit depth for one or more parameters of the video data, wherein the one or more parameters comprise a luma_offset_l0[i] parameter or a luma_offset_l1[i] parameter,
code values for the parameters such that the values for the parameters are representative of bit depths that are based on the value for the syntax element representative of the signaled bit depth, and
code the video data based at least in part on the values for the parameters, wherein the video coder is further configured to, when performing a weighted prediction process for luminance samples:
calculate a value for a variable o0 used in the weighted prediction process as being equal to a value for a luma_offset_l0[refIdxL0] parameter without calculating (1<<(the signaled bit depth minus 8)), and
calculate a value for a variable of used in the weighted prediction process as being equal to a value for a luma_offset_l1[refIdxL1] parameter without calculating (1<<(the signaled bit depth minus 8)).

19. The device of claim 18, wherein the video coder is configured to code the value for the syntax element representative of whether the weighted prediction having the signaled bit depth is enabled in a sequence parameter set (SPS) for a sequence of pictures of the video data.

20. The device of claim 18, wherein the video coder is configured to code a value for the luma_offset_l0[i] parameter or the luma_offset_l0[i] parameter comprises code a value in the range of −2 raised to (the signaled bit depth minus 1) to 2 raised to (the signaled bit depth minus 1) minus 1, inclusive.

21. The device of claim 8, wherein the one or more weighted prediction parameters comprise a delta_chroma_offset_l0[i][j] parameter or a delta_chroma_offset_l1[i] [j] parameter, and wherein the video coder is configured to code a value for the delta_chroma_offset_l0[i][j] parameter or the delta_chroma_offset_l1[i][j] parameter as a value in the range of −2 raised to (the signaled bit depth plus 1) to 2 raised to (the signaled bit depth plus 1) minus 1 inclusive.

22. The device of claim 21, wherein the video coder is configured to, when performing a weighted prediction process for chrominance samples: calculate a value for a ChromaOffsetL0[refIdxL0][cIdx−1] variable from the delta_chroma_offset_l0[i][j] parameter, calculate a value for a variable o0 used in a weighted prediction process as being equal to the ChromaOffsetL0[refIdxL0][cIdx−1] variable, without calculating (1<<(the signaled bit depth minus 8)), calculate a value for a ChromaOffsetL1[refIdxL1][cIdx−1] variable from the delta_chroma_offset_l1[i][j] parameter, and calculate a value for a variable of used in the weighted prediction process as being equal to the ChromaOffsetL1 [refIdxL1][cIdx−1] variable, without calculating (1<<(the signaled bit depth minus 8)).

23. The device of claim 18, wherein the one or more parameters comprise the luma_offset_l0[i] parameter, the luma_offset_l1[i] parameter, a delta_chroma_offset_l0[i][j] parameter, and a delta_chroma_offset_l1[i][j] parameter.

24. The device of claim 18, wherein the video coder comprises a video decoder.

25. The device of claim 18, wherein the video coder comprises a video encoder.

26. The device of claim 18, wherein the syntax element representative of whether the weighted prediction having the signaled bit depth is enabled comprises use_high_precision_weighted_prediction_flag.

27. The device of claim 18, wherein the device comprises at least one of:
an integrated circuit;
a microprocessor; and
a wireless communication device.

28. A device for coding video data, the device comprising:
means for coding a value for a syntax element representative of whether weighted prediction having a signaled bit depth is enabled for video data;
means for coding a value for a syntax element representative of the signaled bit depth for one or more parameters of the video data when the value for the syntax element indicates that the weighted prediction having the signaled bit depth is enabled, wherein the one or more parameters comprise a luma_offset_l0[i] parameter or a luma_offset l1[i] parameter;
means for coding values for the parameters such that the values for the parameters are representative of bit depths that are based on the value for the syntax element representative of the signaled bit depth when the value for the syntax element indicates that the weighted prediction having the signaled bit depth is enabled; and means for coding the video data based at least in part on the values for the parameters when the value for the syntax element indicates that the weighted prediction having the signaled bit depth is enabled, wherein the means for coding the video data comprise:

means for calculating a value for a variable o0 used in the weighted prediction process as being equal to a value for a luma_offset_l0[refIdxL0] parameter without calculating (1<<(the signaled bit depth minus 8)) when performing a weighted prediction process for luminance samples; and means for calculating a value for a variable o1 used in the weighted prediction process as being equal to a value for a luma_offset_l1[refIdxL1] parameter without calculating (1<<(the signaled bit depth minus 8)) when performing the weighted prediction process for luminance samples.

29. A non-transitory computer-readable storage medium having stored thereon instructions that, when executed, cause a processor to:

code a value for a syntax element representative of whether weighted prediction having a signaled bit depth is enabled for video data;

when the value for the syntax element indicates that the weighted prediction having the signaled bit depth is enabled:

code a value for a syntax element representative of the signaled bit depth for one or more parameters of the video data, wherein the one or more parameters comprise a luma_offset_l0[i] parameter or a luma_offset_l1[i] parameter;

code values for the parameters such that the values for the parameters are representative of bit depths that are based on the value for the syntax element representative of the signaled bit depth; and code the video data based at least in part on the values for the parameters, wherein the instructions that cause the processor to code the video data comprise instructions that cause the processor to, when performing a weighted prediction process for luminance samples:

calculate a value for a variable o0 used in the weighted prediction process as being equal to a value for a luma_offset_l0[refIdxL0] parameter without calculating (1<<(the signaled bit depth minus 8)); and calculate a value for a variable of used in the weighted prediction process as being equal to a value for a luma_offset_l1[refIdxL1] parameter without calculating (1<<(the signaled bit depth minus 8)).

30. The non-transitory computer-readable medium of claim 29, wherein the instructions that cause the processor to code the value for the syntax element indicating that the weighted prediction having the signaled bit depth is enabled comprise instructions that cause the processor to code a value for a syntax element of a sequence parameter set (SPS) for a sequence of pictures of the video data.

31. The non-transitory computer-readable medium of claim 29, wherein the one or more parameters comprise a luma_offset_l0[i] parameter or a luma_offset_l1[i] parameter, and wherein the instructions that cause the processor to code a value for the luma_offset_l0[i] parameter or the luma_offset_l0[i] parameter comprise instructions that cause the processor to code a value in the range of −2 raised to (the signaled bit depth minus 1) to 2 raised to (the signaled bit depth minus 1) minus 1, inclusive.

32. The non-transitory computer-readable medium of claim 29, wherein the one or more weighted prediction parameters comprise a delta_chroma_offset_l0[i][j] parameter or a delta_chroma_offset_l1[i][j] parameter, and wherein the instructions that cause the processor to code a value for the delta_chroma_offset_l0[i][j] parameter or the delta_chroma_offset_l1[i][j] parameter comprise instructions that cause the processor to code a value in the range of −2 raised to (the signaled bit depth plus 1) to 2 raised to (the signaled bit depth plus 1) minus 1 inclusive.

33. The non-transitory computer-readable medium of claim 32, wherein the instructions that cause the processor to code the video data comprise instructions that cause the processor to, when performing a weighted prediction process for chrominance samples:

calculate a value for a ChromaOffsetL0[refIdxL0][cIdx−1] variable from the delta_chroma_offset_l0[i][j] parameter;

calculate a value for a variable o0 used in the weighted prediction process as being equal to the ChromaOffsetL0[refIdxL0 ][cIdx−1] variable, without calculating (1<<(the signaled bit depth minus 8));

calculate a value for a ChromaOffsetL1[refIdxL1][cIdx−1] variable from the delta_chroma_offset_l1[i][j] parameter; and calculate a value for a variable of used in the weighted prediction process as being equal to the ChromaOffsetL1[refIdxL1][cIdx−1] variable, without calculating (1<<(the signaled bit depth minus 8)).

34. The non-transitory computer-readable storage medium of claim 29, wherein the one or more parameters comprise a luma_offset_l0[i] parameter, a luma_offset_l1[i] parameter, a delta_chroma_offset_l0[i][j] parameter, and a delta_chroma_offset_l1[i][j] parameter.

35. The non-transitory computer-readable storage medium of claim 29, wherein the syntax element representative of whether the weighted prediction having the signaled bit depth is enabled comprises use_high_precision_weighted_prediction_flag.

* * * * *